W. H. STUART & J. W. HALLARD.
COMBINATION TOOL.
APPLICATION FILED DEC. 13, 1910.
1,001,229.
Patented Aug. 22, 1911.
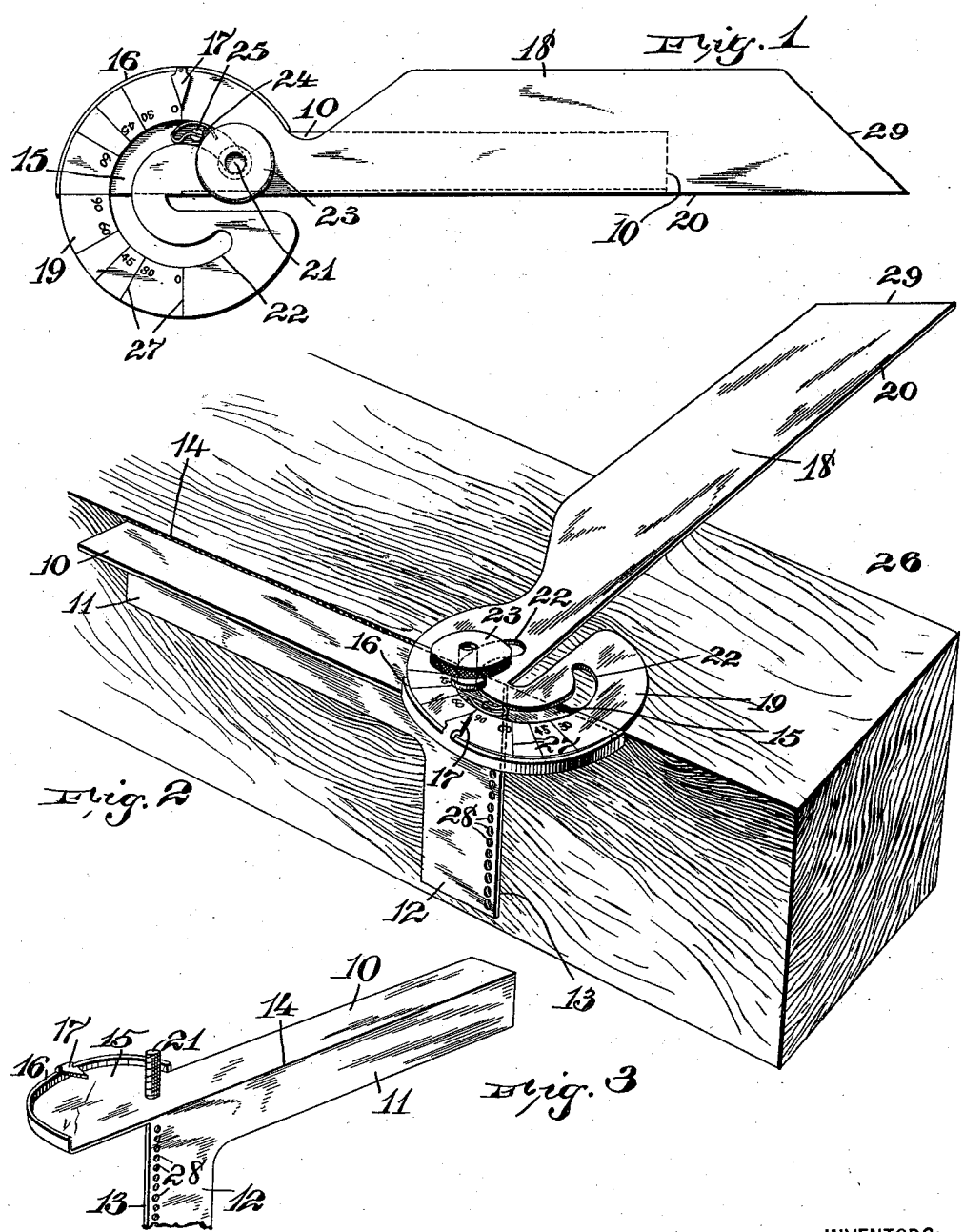

UNITED STATES PATENT OFFICE.

WILLIAM HENRY STUART, OF RAHWAY, AND JAMES WILLIAM HALLARD, OF PLAINFIELD, NEW JERSEY.

COMBINATION-TOOL.

1,001,229.  Specification of Letters Patent.  Patented Aug. 22, 1911.

Application filed December 13, 1910. Serial No. 597,047.

*To all whom it may concern:*

Be it known that we, WILLIAM HENRY STUART and JAMES WILLIAM HALLARD, citizens of the United States, residing at Rahway and Plainfield, respectively, in the county of Union and State of New Jersey, have invented certain new and useful Improvements in Combination-Tools; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention is designed to provide a tool for carpenters' use, and for the use of other artisans, which tool embodies a bevel and a square, and provides also a depending plate, which, with the two edges of the bevel, furnish three edges which converge to the same point.

The tool comprises a plate forming one member and a right-angled sheet forming a second member, these members being secured in swinging relation to each other and provided with means for securing them in their adjusted positions.

The invention is illustrated in the accompanying drawings, in which—

Figure 1 is a plan view of the tool. Fig. 2 is a perspective view illustrating the tool used as a square, on a piece of timber, and Fig. 3 is a perspective view of the right-angled sheet.

The tool comprises a right-angled sheet having the strips 10 and 11, the strip 10 being horizontal and the strip 11 vertical, the strip 11 having its depending portion 12, with an edge 13, at right angles to the edge 14 of the sheet. The strip 10 is widened at one end to form a table 15, which is made with a curved upwardly-turned rim 16 at its margin, the rim having a pointer 17 bent up from it and extending inwardly, the purposes of the pointer being described hereinafter. The rim 16 is concentric to the edge 13 of the depending plate 12, that is, the center of the table is in line with the edge 13.

The plate 18 is provided with a head 19, which is curved to fit in the rim 16, and thus swing on the strip 10. The edge 20, of the plate 18, is in line with the center of the head 19, and is thus brought in line with edge 14 of the strip 10 when swung to the position shown in Fig. 1.

The table 15 has a screw-threaded stud 21 projecting therefrom, and a circular slot 22, in the head 19, permits the head to swing in the rim and on the stud. A nut 23 screws on the stud 21 and when forced down locks the two members of the tool together, so that they can not be swung on each other. A tension spring 24 is fastened by a stud or solder 25 to the table 15, and bears on the edge of the slot 22 to prevent the free swinging of the members when the nut 23 is unscrewed.

It will be understood that other means than those described herein can be used for holding the two members in swinging relation and for securing them in their adjusted positions.

Fig. 2 shows one of the positions and illustrates the advantages of the tool. The device is shown on a piece of timber 26 and it illustrates how, after the edge 14 is placed against the side of the timber, the edge 20 and also the edge 13 can be used for marking, so that the two faces of the timber can be marked with lines that are in the same plane, without moving the tool. Lines other than right-angled ones can be arrived at by swinging the plate 18 on the table 15, and thus forming an oblique angle between the edges 20 and 14. A scale 27 coöperates with the pointer 17 to indicate the angle assumed by the edge 20 in its relation to the edge 14. In other words, the edges 13, 14, and 20 always converge to the same center no matter to what position the plate 18 is swung.

The depending plate 12 is provided with a series of perforations 28, parallel with the edge 13, these perforations being suitably spaced apart as at one-sixteenth or one-eighth of an inch, and they permit the insertion of a pencil point for marking off distances for lines for mortising and similar work.

The outer end of the plate 18 is cut off at an angle of 45 degrees as at 29, which is found very handy for marking off short lines at this angle. The slot 22 in the head 15 is the major portion of a circle so that the plate 18 can be swung around through 180 degrees, and can thus be made to lie above the strip 10, or swung in extension thereof.

Having thus described our invention, what we claim is:—

1. A combination tool comprising a right-angled sheet forming strips, the vertical strip having a depending plate with a straight edge thereon, a table on the horizontal strip of the sheet, a marginal rim on the table, a plate having a circular head to fit in the rim, the head being slotted, a screw-threaded stud on the table extending through the slot in the head, a nut on the stud for securing the table and head together, the edge of the plate, the vertical strip and the edge of the depending plate all passing through the pivot of the plate and sheet, and a pointer and scale on the plate and sheet to indicate the angle at which they are placed.

2. A combination tool comprising a right-angled sheet forming strips, the vertical strip having a depending plate with a straight edge thereon, a table on the horizontal strip of the sheet, a marginal rim on the table, a plate having a circular head to fit in the rim, the head being slotted, a screw-threaded stud on the table extending through the slot in the head, a nut on the stud for securing the table and head together, the edge of the plate, the vertical strip and the edge of the depending plate all passing through the pivot of the plate and sheet, and a pointer and scale on the plate and sheet to indicate the angle at which they are placed, the depending plate having a series of perforations parallel with its edge, for receiving a pencil point.

In testimony that we claim the foregoing, we have hereunto set our hands this seventh day of September 1910.

WILLIAM HENRY STUART.
JAMES WILLIAM HALLARD.

Witnesses:
 L. E. HART,
 WM. P. JEARMONT.

---

Copies of this patent may be obtained for five cents each, by addressing the "Commissioner of Patents, Washington, D. C."